No. 764,976. PATENTED JULY 12, 1904.
E. W. BARRATT.
CANDY PULLING MACHINE.
APPLICATION FILED JAN. 16, 1904.
NO MODEL.
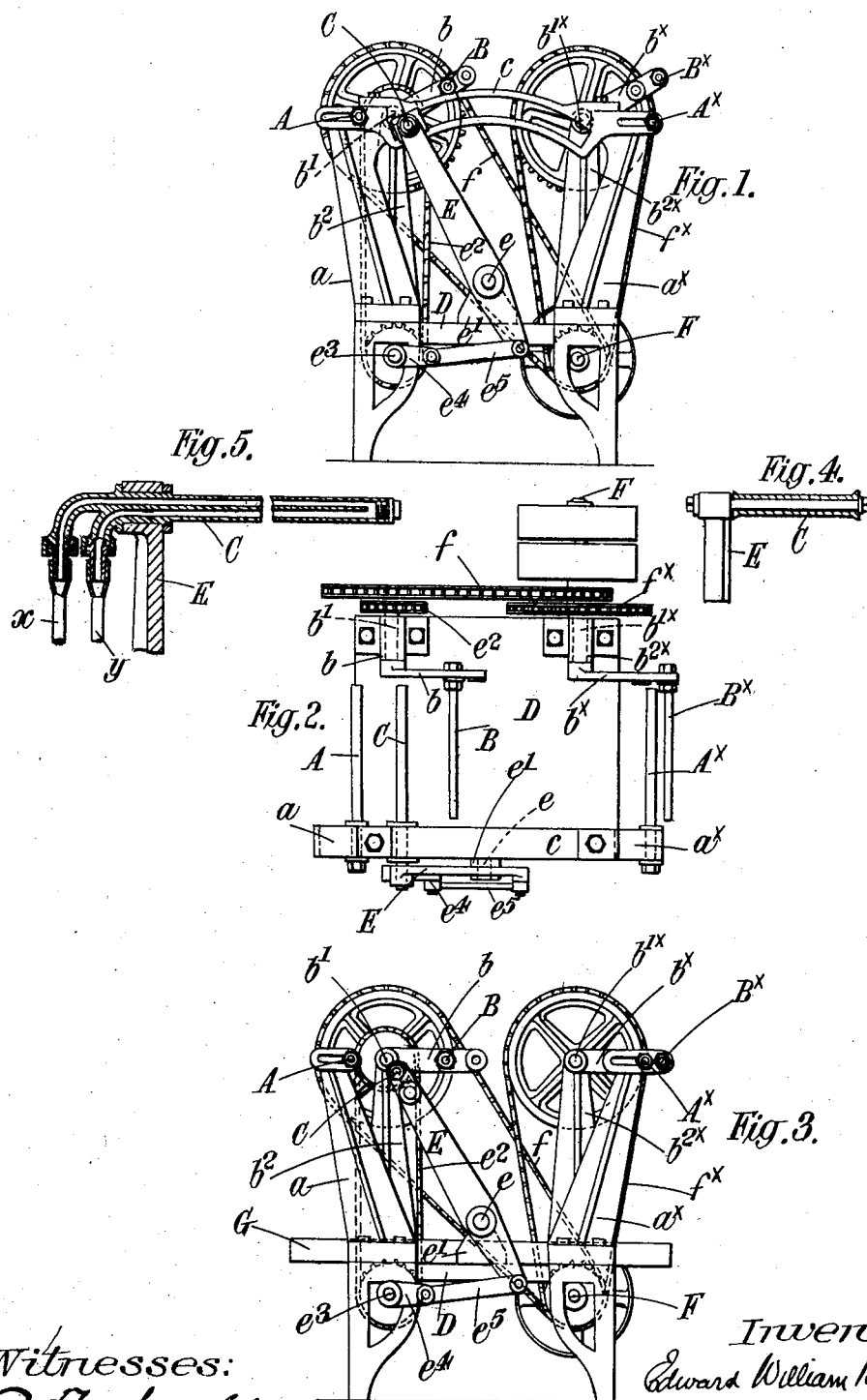

No. 764,976.

Patented July 12, 1904.

UNITED STATES PATENT OFFICE.

EDWARD WILLIAM BARRATT, OF WOOD GREEN, ENGLAND.

CANDY-PULLING MACHINE.

SPECIFICATION forming part of Letters Patent No. 764,976, dated July 12, 1904.

Application filed January 16, 1904. Serial No. 139,300. (No model.)

*To all whom it may concern:*

Be it known that I, EDWARD WILLIAM BARRATT, manufacturer, a subject of the King of Great Britain, residing at No. 1 Tower Terrace, Wood Green, in the county of Middlesex, England, have invented certain new and useful Improvements in Candy-Pulling Machines, of which the following is a specification.

This invention relates to machines for performing the operation known as "pulling" sugar or candy.

The chief object of my invention is to devise a simple and effectual machine for this purpose.

According to my invention the machine comprises a plurality of rotary hooks and one or more stationary hooks so arranged with respect to the rotary hooks and to one or more sliding or reciprocating hooks that when operated by suitable mechanism the rotary hooks will travel around the stationary and sliding hooks in such a manner as to perform the pulling operation of the sugar or candy when the latter is placed in the machine in a suitable condition of plasticity. By the term "hooks" I refer to the parts that directly act upon the sugar or candy during the pulling operation and that are generally known by such term in connection with sugar or candy pulling machines. This term is therefore used above and subsequently in its technical sense and not with regard to the shape of the parts designated thereby, said parts being usually in the form of straight supports or rods. A convenient arrangement of the said hooks consists in placing two of the stationary hooks in a horizontal plane and at such a distance from the rotary hooks that the latter will describe circles eccentrically around them, while a single sliding or reciprocating hook is adapted in its movements to alternately come within the path of first one and then the other of said circles described by the rotary hooks. The said circles do not in this case intersect, although I may, if desired, so arrange the rotary hooks that their circles do intersect, in which case the sliding or reciprocating hook might be dispensed with.

In order that my said invention may be clearly understood and readily carried into effect, I will describe the same more fully with reference to the accompanying drawings, in which—

Figure 1 is a front elevation, and Fig. 2 a plan, of the machine. Fig. 3 is a front elevation showing a modification of the machine illustrated in Figs. 1 and 2. Figs. 4 and 5 represent, chiefly in vertical section, hook portions of the device, showing different modifications.

A $A^\times$ are the stationary hooks. B $B^\times$ are the rotary hooks, and C is the sliding or reciprocating hook.

The stationary hooks A $A^\times$ are supported in brackets or uprights $a$ $a^\times$, bolted or otherwise firmly secured to the front part of the base D of the machine. These hooks project inwardly, and in the example illustrated they lie in the same or approximately the same horizontal plane. The upper ends of the brackets or uprights $a$ $a^\times$ are preferably slotted, as shown, so as to permit of the stationary hooks being adjusted horizontally, if desired.

The rotary hooks B $B^\times$ are carried near the extremities of radial arms $b$ $b^\times$, which are mounted on axles $b'$ $b'^\times$, adapted to revolve in bearings situated at the upper ends of brackets or uprights $b^2$ $b^{2\times}$, or otherwise firmly secured to the rear part of the aforesaid base D of the machine. The said rotary hooks project inwardly—*i. e.*, toward the brackets carrying the stationary hooks—and their axles lie in the same or approximately the same horizontal plane as that of the stationary hooks. The relative position of the axles to each other and to the stationary hooks is such that the rotary hooks revolve about the stationary hooks in circles that are eccentric thereto and that do not intersect each other.

The sliding or reciprocating hook C is arranged in a curved slot or guide $c$, formed in a cross-piece connecting together the upper ends of the brackets or uprights $a$ $a^\times$, said hook projecting inwardly—that is to say, in the same direction as the stationary hooks. The outer end of the sliding or reciprocating hook is connected with the upper end of a swinging arm E, which is pivoted at $e$ in a bracket $e'$, bolted or otherwise secured to the base of the machine. As this arm E rocks during the working of the machine it alternately carries the sliding or reciprocating hook within the path of first one and then the other of the rotary hooks.

Motion is imparted to the various parts of the machine from a main shaft F, which extends across and beneath the base D. This shaft carries two sprocket-pinions, one of which is geared by an endless chain $f$ with a sprocket-wheel on the axle of the rotary hook B and the other of which is geared by an endless chain $f^\times$ with a sprocket-wheel on the axle of the rotary hook $B^\times$, whereby rotary motion is imparted to said hooks in the same direction. The angular position of the radial arms relatively to each other instead of being that shown in the drawings may be such that during part of their revolution—that is to say, when their ends are adjacent—one hook will be traveling along its circular course in a downward direction, while the other will be traveling in an upward direction. The axle $b'$ of the radial arm $b$ is also furnished with another sprocket-wheel, which by means of an endless chain $e^2$ imparts motion to a shaft $e^3$ by a sprocket-wheel on the latter. This shaft extends across and below the bed of the machine and at its front or outer end carries a crank $e^4$, which is connected by a rod $e^5$ with the lower end of the swinging arm E and imparts rocking motion thereto and through it reciprocating motion to the sliding hook. In the modification illustrated by Fig. 3 the said slot or guide $c$ is dispensed with and the sliding or reciprocating hook supported entirely by the swinging arm E. In other respects this form of the machine is similar to that shown by Figs. 1 and 2.

The arms $b\ b^\times$, carrying the rotary hooks, and the swinging arm E, carrying the reciprocating hook, Fig. 3, may be formed with several holes for the reception of the hooks, so that their position relatively to the ends of their arms may be varied in accordance with the holes into which they are screwed or otherwise secured.

I wish it to be understood that I do not confine myself to the employment of two stationary hooks, two rotary hooks, and one sliding or reciprocating hook, as this number of the hooks may be varied so long as not less than two rotary hooks are employed. One of the stationary hooks may in many cases be dispensed with. The means for imparting motion to the sliding or reciprocating hook may also be modified without departing from the nature of my invention.

The aforesaid various hooks may be provided with revolving rollers or sleeves having convex disks or enlargements at their ends, as shown by Fig. 4, or they may be otherwise formed to assist in directing the sugar or candy toward the middle of said hooks, so that its tendency to accumulate at either end of or to escape from the hooks would be overcome. The stationary and sliding or reciprocating hooks are also preferably so constructed that steam or other heating fluid or cold water or other cooling fluid can be supplied thereto for keeping them at any required temperature. For this purpose these hooks may be made as shown by Fig. 5, in which they are formed with two internal passages, one of which is connected with the inlet-pipe $x$ and the other with the outlet-pipe $y$.

The base of the said machine may also be provided with a movable tray or table G, Fig. 3, so that if the sugar or candy being pulled should fall from the hooks it will be received by said movable tray or table, by the withdrawal of which the sugar or candy can be readily removed from the machine and picked up without fear of the attendant being injured by the working parts of the machine, and, if desired, suitable means may be provided for mechanically actuating said tray or table.

My improved machine can be used for the treatment of either comparatively large or comparatively small quantities of sugar or candy at one time, so that it is useful to both large and small manufacturers.

What I claim, and desire to secure by Letters Patent of the United States, is—

1. In a candy-pulling machine, the combination with a plurality of rotary hooks moving in non-intersecting paths of stationary hooks about which the said rotary hooks move in an eccentric path, for the purpose specified.

2. In a candy-pulling machine, the combination with a plurality of rotary hooks, of a stationary hook about which one of said rotary hooks moves, a reciprocating hook, and means for alternately bringing it within the path of first one and then the other of the rotary hooks for the purpose specified.

3. In a candy-pulling machine, the combination with a plurality of rotary hooks of a stationary hook about which one of said rotary hooks moves in a path eccentric with respect thereto, a reciprocating hook, and means for alternately bringing it within the path of first one and then the other of the rotary hooks, for the purpose specified.

4. In a candy-pulling machine, the combination with a plurality of rotary hooks traveling in non-intersecting paths, of a stationary hook about which one of said rotary hooks moves in a path eccentric with respect thereto, a reciprocating hook, and means for alternately bringing it within the path of first one and then the other of the rotary hooks for the purpose specified.

5. In a candy-pulling machine, the combination with a plurality of rotary hooks, of radial arms carrying said hooks, shafts upon which said arms are set angularly in advance one of the other, means for driving said shafts in the same direction of revolution, a stationary hook about which one of the rotary hooks moves in a path eccentric with respect thereto, a reciprocating hook, and means for alternately bringing it within the path of first one and then the other of the rotary hooks for the purpose specified.

6. In a candy-pulling machine, the combination with a plurality of rotary hooks, of radial arms carrying said hooks, shafts upon which said arms are set angularly in advance one of the other, chain-gearing for driving said shafts and radial arms in the same direction of revolution, a stationary hook about which one of the rotary hooks moves in a path eccentric with respect thereto, a reciprocating hook, and means for alternately bringing it within the path of first one and then the other of the rotary hooks for the purpose specified.

7. In a candy-pulling machine, the combination with a plurality of rotary hooks, of a stationary hook about which one of the said rotary hooks moves, means for adjusting the position of said stationary hook with respect to the path of the rotary hook that revolves about it, a reciprocating hook, and means for alternately bringing it within the path of first one and then the other of the rotary hooks for the purpose specified.

8. In a candy-pulling machine, the combination with a plurality of rotary hooks, of a stationary hook about which one of the said rotary hooks moves, a horizontally-slotted bracket carrying said stationary hook, means for retaining said hook in any desired position of adjustment in said slotted bracket, a reciprocating hook, and means for alternately bringing it within the path of first one and then the other of the rotary hooks for the purpose specified.

9. In a candy-pulling machine, the combination with a plurality of rotary hooks, of a stationary hook about which one of the said rotary hooks moves in a path eccentric with respect thereto, a reciprotating hook, a rocking arm carrying said hook, and means for oscillating said arm for the purpose specified.

10. In a candy-pulling machine, the combination with a plurality of rotary hooks, of a stationary hook about which one of the said rotary hooks moves in a path eccentric with respect thereto, a reciprocating hook, a rocking arm adjustably carrying said hook, and means for oscillating said arm for the purpose specified.

11. In a candy-pulling machine, the combination with a plurality of rotary hooks, of a stationary hook about which one of the said rotary hooks moves in a path eccentric with respect thereto, a reciprocating hook, a rocking arm carrying said hook, a curved guide for the hook to slide in, and means for oscillating said arm for the purpose specified.

12. In a candy-pulling machine, the combination with a plurality of rotary hooks, of a stationary hook about which one of the said rotary hooks moves in a path eccentric with respect thereto, a reciprocating hook, a rocking arm carrying said hook, and crank and connecting-rod mechanism for oscillating said arm for the purpose specified.

13. In a candy-pulling machine, the combination with a plurality of rotary hooks, of a plurality of stationary hooks about each of which one of said rotary arms moves in a path eccentric with respect thereto, a reciprocating hook, and means for alternately bringing it within the path of first one and then the other of the rotary hooks, for the purpose specified.

14. In a candy-pulling machine, the combination with a plurality of rotary hooks, of a stationary hook about which one of said rotary hooks moves, a reciprocating hook, means for alternately bringing it within the path of first one and then the other of the rotary hooks, and sleeves mounted on the said hooks substantially as and for the purpose specified.

15. In a candy-pulling machine, the combination with a plurality of rotary hooks, of a stationary hook about which one of said rotary hooks moves, a reciprocating hook, means for alternately bringing it within the path of first one and then the other of the rotary hooks, and a removable tray adapted to lie beneath the said hooks for the purpose specified.

16. In a candy-pulling machine, the combination with a plurality of rotary hooks, of a stationary hook about which one of said rotory hooks moves, a reciprocating hook, means for alternately bringing it within the path of first one and then the other of the rotary hooks, and means for supplying fluid to the stationary and reciprocating hooks for regulating the temperature thereof substantially as described.

In testimony whereof I have hereunto set my hand, in presence of two subscribing witnesses, this 5th day of January, 1904.

EDWARD WILLIAM BARRATT.

Witnesses:
  T. SELLY WARDLE,
  GEORGE I. BRIDGES.